United States Patent [19]

Olson

[11] 4,204,374
[45] May 27, 1980

[54] EDGE DESIGN FOR IMPACT RESISTANT WINDSHIELD

[75] Inventor: Jan B. Olson, Northridge, Calif.
[73] Assignee: The Sierracin Corporation, Sylmar, Calif.
[21] Appl. No.: 850,298
[22] Filed: Nov. 10, 1977
[51] Int. Cl.$^2$ .............................................. E04C 1/00
[52] U.S. Cl. .................................... 52/208; 244/121; 428/412; 52/397
[58] Field of Search .................. 52/208, 398, 400, 98, 52/1, 827, 397, 822, 7, 88; 244/121; 428/412

[56] References Cited

U.S. PATENT DOCUMENTS

| | | | |
|---|---|---|---|
| 2,398,886 | 4/1946 | Drake | 52/208 |
| 2,409,808 | 10/1946 | Sowle | 52/400 |
| 2,659,686 | 11/1953 | Watkins | 52/208 |
| 2,834,998 | 5/1958 | Wilder | 244/121 |
| 3,382,630 | 3/1968 | Chivers | 52/208 |
| 3,817,012 | 6/1974 | Wack | 52/315 |
| 4,068,441 | 1/1978 | Shaffer | 52/315 |
| 4,081,581 | 3/1978 | Littell | 428/412 |

Primary Examiner—James A. Leppink
Assistant Examiner—Henry E. Raduazo
Attorney, Agent, or Firm—Christie, Parker & Hale

[57] ABSTRACT

This aircraft windshield resistant to penetration by impact with birds has a plurality of transparent plastic sheets bonded together with flexible interlayers. The innermost sheet of the laminate is formed of a polycarbonate. A metal bearing strip is adhesively bonded to the inside face of the innermost sheet along at least one edge with the inboard edge of the bearing strip curling gradually away from the inner face of the innermost plastic sheet and with a wedge-shaped body of flexible adhesive therebetween. A row of countersunk attachment holes along the edge of the windshield extends through the transparent sheets and the bearing strip and each contains a bushing for receiving a flat head bolt for connecting the windshield to an airframe structure. The inner end of each bushing has an enlarged shoulder having a length not less than the thickness of the bearing strip for bearing on the airframe structure. In case of bird impact the windshield can flex and the bearing strip inhibits edge breakage and tearing of the windshield adjacent the attachment holes. It also assures an adequate bend radius in the plastic to prevent breakage. Broaching of the bolt heads through plastic absorbs impact energy and protects the bolts from tensile and bending failure. A shallow V-shaped edge sealant configuration is also provided.

29 Claims, 3 Drawing Figures

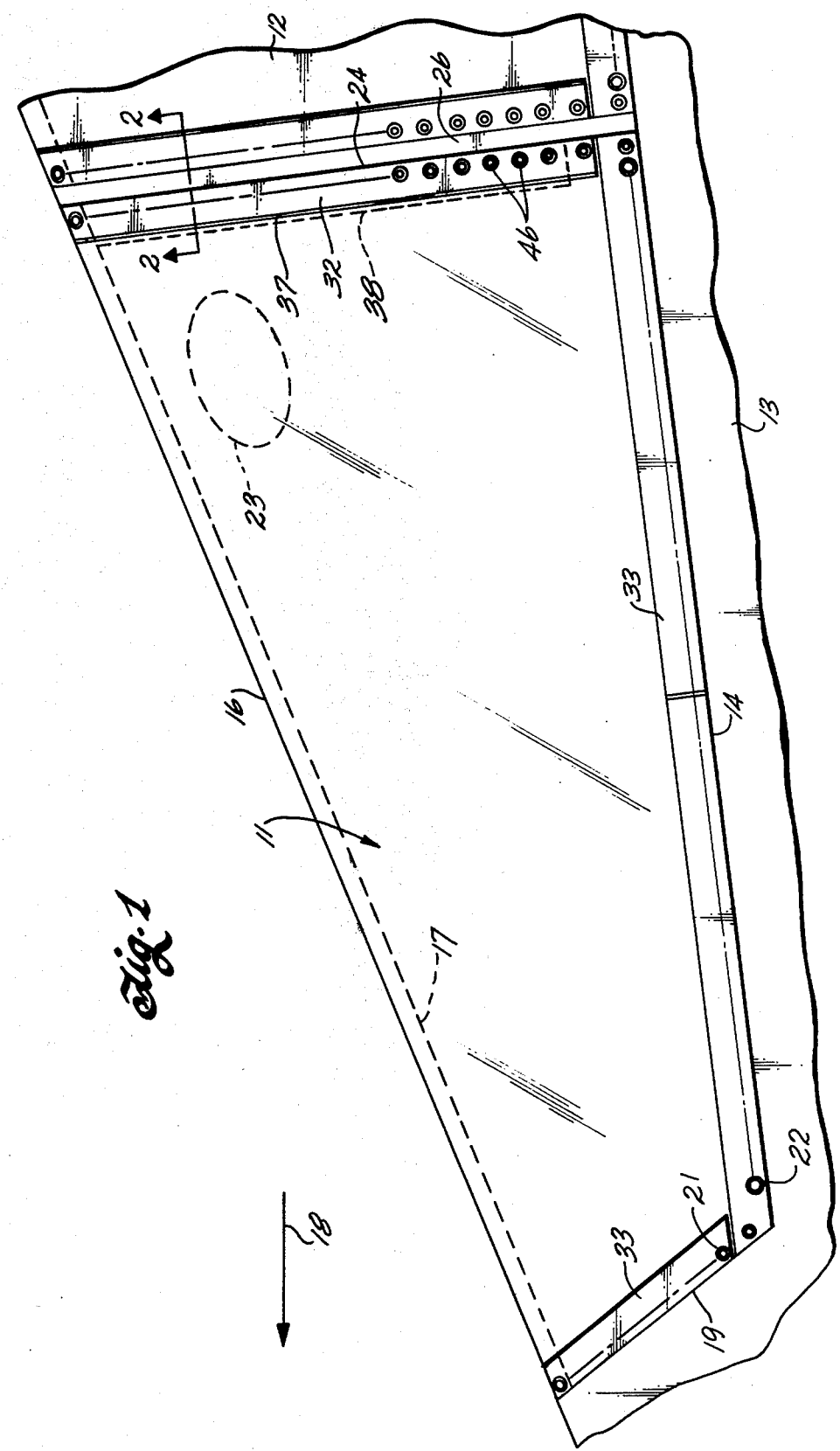

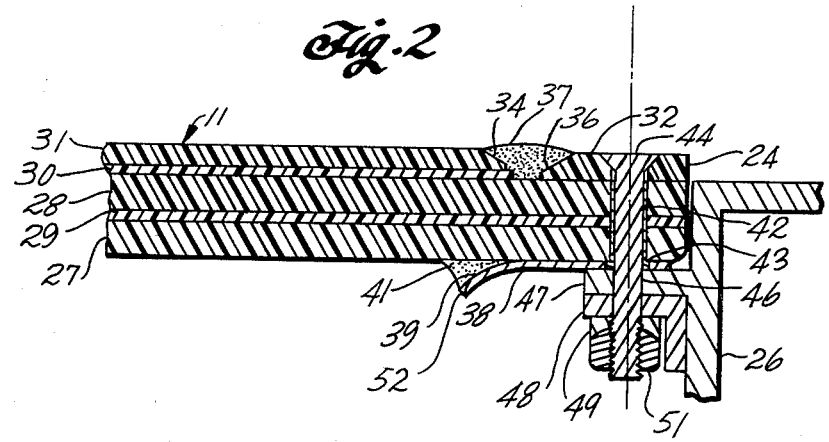
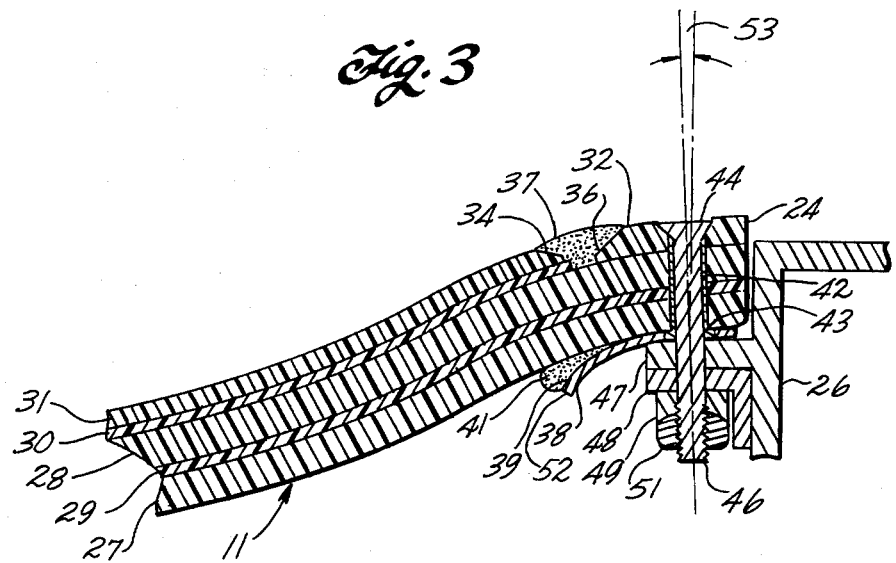

EDGE DESIGN FOR IMPACT RESISTANT WINDSHIELD

BACKGROUND

When aircraft are flying at low altitude there is a significant hazard from striking birds in the air. If a bird should hit the windshield of an airplane it can penetrate the window and/or cause spalling of window fragments with a high degree of hazard to the pilots. This hazard becomes quite high for military aircraft which may be called upon to fly at high speeds at very low elevations. Commercial and private aircraft are also susceptible to this problem but usually fly at lower speeds at low elevations.

Aircraft used for some commercial purposes must be qualified for airworthiness by Federal Aviation Administration certification, and it is required for some such aircraft to qualify under FAA Part 25 which includes resistance to a standardized bird impact test.

In the standardized test the carcass of a four pound chicken is propelled against an airplane windshield at a selected velocity. In one aircraft, for example, it is desired to have the windhsield withstand such an impact of a four pound chicken at a velocity of 500 knots.

For successfully withstanding such a severe test there should be no penetration of the window by any part of the bird, that is, the bird should not penetrate in the area of impact and there should not be sufficient gap produced at the edge of the window to permit part of the bird to enter the cockpit. Further, the edge of the window should remain sufficiently intact and secured to the airframe that no large rush of air enters the cockpit. The window should also be resistant to spalling of fragments from the interior surface of the window.

Glass and stretched acrylic have not proved to be completely satisfactory materials for windows having resistance to bird impact at high velocity. Glass is heavy and it can break or spall easily. Stretched acrylic can be subject to many of the problems encountered in glass. Windows have been suggested employing polycarbonate resin sheets. Without special provisions these windows are heavy and difficulty can be encountered due to tearing of the window in the edge portions or breakage of mounting bolts so that a gap is formed between the edge of the window and the airframe in which it is mounted. In some aircraft the region most subject to failure is along the aft edge of the window near a region of impact a few inches forward of the aft edge.

It is therefore desirable to provide a window for airplanes which is capable of withstanding impact with birds at relatively high speeds.

BRIEF SUMMARY OF THE INVENTION

There is, therefore, provided in practice of this invention, a bird-resistant windshield comprising a transparent laminate including a plurality of transparent synthetic plastic sheets bonded together by at least one flexible interlayer, the innermost sheet being polycarbonate resin. The windshield has a metal bearing strip adhesively bonded to at least one edge of the innermost sheet on the inner face thereof and a row of attachment holes extends through at least the innermost sheet and the bearing strip. The inboard edge of the bearing strip curls gradually away from the inner face of the polycarbonate sheet and a generally wedge-shaped body of flexible adhesive between the bearing strip and polycarbonate helps provide gradually increasing load on the edge of the windshield in case of bird impact. The curved bearing strip also accommodates bending of the plastic window with a sufficiently large bend radius to avoid breakage. Preferably the effective strength and ductility of the bearing strip adjacent such attachment holes in the plane of the windshield is approximately the same as the effective strength and ductility of the innermost sheet adjacent such holes. Undue loading or stress upon window rotation can be minimized by providing a bushing through each hole with an enlarged shoulder having a length no less than the thickness of the bearing strip tightly fitted into a hole in the bearing strip. The bushing tightly fits the hole and receives a bolt for connecting the windshield to an essentially rigid aircraft structure. A reinforced plastic edge attachment strip is applied on the outside of the window along the row of attachment holes. Broaching of a bolt head through the edge strip and plastic of the windshield can permit windshield rotation without bolt breakage.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in side view an aircraft windshield constructed according to principles of this invention;

FIG. 2 is a fragmentary cross section at the aft edge of the windshield of FIG. 1; and FIG. 3 is a semi-schematic fragmentary cross section similar to FIG. 2 indicating deflection of the windshield edge upon impact with a bird.

DESCRIPTION

FIG. 1 illustrates in side view an aircraft windshield constructed according to principles of this invention. The terms windshield, window and transparency can be used interchangeably in the context of this development. As illustrated in this embodiment, the windshield has four transparent panels, two of which are seen in the side view of FIG. 1. A forward transparent windshield panel 11 is seen in this side view and incorporates an embodiment of this invention. An aft window panel or transparent canopy 12 is also mounted in the aircraft structure 13. The upper edge 16 of the forward panel 11 is substantially perpendicular to the plane of the paper in FIG. 1 and lies approximately along the center line of the airplane extending in a fore and aft direction. The upper or center-line edge 16 of the window is connected to a longitudinally extending beam 17 of the aircraft structure. The forward windshield panel 11 is curved in the general form of a cone so that its lower edge 14 is more or less vertical and on the side of the airplane structure. The lower edge faces the plane of the paper in FIG. 1.

In FIG. 1 the forward or flight direction of the airplane is indicated by an arrow 18 pointing to the left in FIG. 1. If the window were struck by a bird or other object, the object would be travelling from left to right in FIG. 1. It will also be noted that in this embodiment the angle of attack of the window is quite acute.

As used herein the term "forward" refers to the forward end of the aircraft in the flight direction and "aft" refers to the rear end or trailing end of the aircraft. The terms "inner" or "inside" refer to the face of the window that is inside the cockpit and "outer" or "outside" refer to the face exposed to the air stream. The "outward" direction is toward the outside of the airplane. The term "outboard" refers to a direction in the plane of the window away from the edge of the window and "inboard" refers to a direction in the plane of the window more or less towards the center or interior of the window. The term "plane" is used in the sense of being parallel to the surface of the window in the region under discussion even though the windshield is not flat or "planar".

The forward edge 19 of the window is connected to the airframe structure by a row of flat head bolts 21. It will be realized that in the illustration of FIG. 1 such bolts are shown schematically since the bolts near the center line 16 of the aircraft would be seen almost edge on and since they are countersunk to be flush with the window they would not appear as a circle as shown in the figure. The same is true along the aft edge of the window.

The lower edge 14 of the window is connected to the airframe structure by a row of countersunk flat head bolts 22.

It has been found that with a windshield as illustrated in FIG. 1, the most critical area for bird impact is in the general region indicated by a dashed ellipse 23. The windshield is resistant to penetration and spalling throughout. If an impact occurs in the critical region 23, it is found that stresses on the edge of the window are greatest. In particular, high stresses are applied to the window along the aft edge 24 where it connects to a substantially rigid frame member 26 which forms part of the aircraft structure. The windshield described herein can withstand impact with a four pound bird in the critical region 23 at 500 knots and at higher speeds in other regions.

FIG. 2 illustrates in fragmentary cross section the structure adjacent the aft edge 24 of the window 11. In the presently preferred embodiment the laminated windshield has an inner sheet or ply 27 formed from ¼ inch thick transparent polycarbonate resin, such as available from General Electric Company under their trademark LEXAN and from Mobay Chemical Company under their trademark MERLON. The innermost sheet 27 is bonded to an intermediate ¼ inch thick sheet of polycarbonate 28 by an interlayer 29. The interlayer 29 is about 0.05 inch thick and is formed of a flexible or elastomeric transparent polyurethane resin. The outermost layer 31 of the laminated windshield is a sheet of as-cast acrylic resin, such as methyl methacrylate about ⅛ inch thick. The acrylic face sheet 31 is bonded to the intermediate polycarbonate layer 28 by an interlayer 32 of flexible or elastomeric silicone resin at least about 0.05 inch thick. The outer face ply 31 is as-cast acrylic to meet scratch, temperature, and weather resistance and optical requirements of an aircraft windshield.

The interlayers 29 and 31 are sufficiently thick and flexible to inhibit propagation of cracks between adjacent sheets of more rigid plastic. Thus, the outer interlayer 32 is sufficiently thick and flexible to avoid propagating cracks directly between the acrylic outer sheet 31 and the intermediate polycarbonate sheet 28. The inner interlayer 29 inhibits propagation of cracks between the two polycarbonate sheets 27 and 28.

It is preferred to employ a polyurethane inner interlayer 29 although in some embodiments a polyvinyl butyral interlayer or the like can be acceptable. A polyurethane interlayer is stiffer than a similar silicone interlayer. The polyurethane interlayer can sustain plastic deformation and therefore attenuates energy better than a silicone interlayer, thereby minimizing energy that need be dissipated elsewhere in case of a bird impact. A polyurethane interlayer is desirable since it does not become unduly brittle at low temperatures and is capable of forming high strength bonds with the polycarbonate sheets employed in the laminate. Preferably the polyurethane has a Shore hardness of about D20 at 100° F. and a Shore hardness of about D35 at 0° F. Such a polyurethane interlayer gives a good balance between stiffness, energy attentuation, shear modulus and flexibility. The outer interlayer 30 is silicone for heat resistance and to provide some thermal insulation for aerodynamic heating.

The acrylic face sheet 31 is about 2.5 inches smaller than the polycarbonate sheets 27 and 28, hence there is an edge margin about 1.25 inches wide around the acrylic face ply. About one inch of this margin adjacent the aft edge of the window is occupied by an edge strip 32 of glass fabric reinforced phenolic resin about ⅛ inch thick, adhesively bonded to the outer face of the intermediate polycarbonate sheet 28. Referring to FIG. 1 it will be noted that similar edge strips 33 are provided along the forward edge 19 and lower edge 14 of the windshield. A similar strip is used on the upper edge 16 of the window but does not show in FIG. 1.

As seen in FIG. 2 the edge of the acrylic face sheet or face ply 31 has an outboard chamfer or bevel 34. Similarly the edge strip 32 has an inboard bevel 36. Each of the bevels diverges from the plane of the window at an angle of about 30°. Collectively these bevels form a shallow V-shaped gap between the edge of the acrylic face ply and the phenolic edge strip. This V-shaped gap is filled with an elastomeric or flexible sealant 37 which can be a room temperature or low temperature curing polyurethane, polysulfide, silicone, or the like. The sealant protects the underlying polycarbonate sheet 28 and interlayer 32 from the elements, thereby inhibiting delamination between the interlayer and either the polycarbonate or acrylic. By beveling the edges of the acrylic face sheet and phenolic edge strip, excellent sealing of the joint is obtained with no tendency for peeling or delamination.

The polycarbonate sheets are the principal structural members of the window and the acrylic face sheet helps protect the polycarbonate on the outside of the aircraft. Aircraft windshields are subject to significant changes in temperature as well as substantial temperature gradients between the inside and outside of the window. For these reasons there can be substantial differences in thermal expansion between the structural members of the window and the face ply, particularly when different compositions of plastic, or plastic and glass are used. To accommodate such differences in thermal expansion, the outer interlayer is sufficiently thick and flexible to permit relative movement of the face ply and the polycarbonate sheets. Thus, for example, the acrylic face ply can be subjected to very low outside temperatures while the interior of the windshield is heated. Appreciable contraction of the acrylic sheet can occur.

The edge attachment strip 32 is secured directly to the intermediate polycarbonate sheet 28. Thus, there is a possibility of appreciable relative movement therebetween which must be accommodated by the sealant 37. The low angle between the bevel surface and the face of the structural sheet assures that stresses in the plane of the window are applied to the sealant bond largely as shear stress along the faying surface rather than as a tensile stress which could cause peeling of the sealant bond. The low angle also significantly increases the area of contact between the flexible sealant and the rigid plastic of the window, thereby lowering stresses as compared with the usual butt joints previously used adjacent plastic sheet edges.

Further, the long path of sealant at the outside of the shallow V-shaped gap allows ample deflection of the sealant to prevent peeling of the sealant at the outside of the window. Such deflection decreases the angle between the outside face of the sealant and the chamfer thereby further assuring application of stress to the faying surface primarily as shear stress and to a lower extent as tensile stress.

The long path of sealant at the outside face of the window due to filling the V-shaped gap has an additional significant advantage. Sealants available for edges of aircraft windshields are subject to deterioration at the surface due to exposure to the elements and to ultraviolet radiation. Degradation of the sealant increases with increased tensile stress. The wide and shallow V-shaped gap between the bevels on the edge of the face ply and the edge attachment strip assures a stress gradient in the sealant with the highest stress towards the inside and the lowest stress at the exposed surface. The low stress at the surface helps minimize the effects of weathering and exposure to ultraviolet.

For best results it is preferred that the chamfers have an angle relative to the plane of the window less than about 45°. When the angle is greater than about 45° mechanical or thermal stresses in the plane of the window are applied to the faying surface, largely as tensile stress with enhanced tendency to peel the adhesive bond of the sealant to the face ply or edge attachment. When the angle between the faying surface and the face of the sheet 28 is less than about 45°, shear stress on the adhesive bond predominates over tensile stress.

It is particularly preferred that the angle between such bevels and the face of the structural sheet be about 30°. This assures that the V-shaped gap is wide and shallow for broad distribution of strain at the outside of the sealant and hence minimized stress, and applies low tensile stress on the sealant bond at the faying surface of the bevels. It also accommodates ease of manufacture of the plastic parts without leaving too thin an edge. Lower angles would make a wider band of sealant around the window edge, interfering with vision through the window.

In other embodiments variations in the V-shaped edge seal can be employed. Thus, for example, a glass face ply is difficult to bevel and an assymetrical seal can be used. If desired, the interlayer adjacent the edge of a glass face ply can be somewhat smaller than the face ply so that there is an undercut region beneath the glass. The undercut beneath the glass face ply can be filled with edge sealant along with the balance of the gap between the edge of the face ply and an edge attachment strip. Alternatively, where a raised region can be tolerated, the sealant can extend over the outside of the glass a short distance. Beveling of the edge attachment strip for bonding to the edge sealant in such an assymetrical edge seal provides many of the above-mentioned advantages.

On the inner face of the window along the critical aft edge 24 and in some embodiments, along a portion of the upper edge 16, there is provided a steel bearing strip 38. The bearing strip is about 0.04 inch thick and is formed of fully annealed type 302 CRES stainless steel. The bearing strip is flat and tightly bonded against the inner polycarbonate sheet 27 along the outboard edge of the window. The inboard edge of the bearing strip curls gradually away from the inner face of the innermost polycarbonate sheet 27 so that there is a convex surface 39 gradually diverging from the polycarbonate sheet. The bearing strip is adhesively bonded to the innermost sheet 27 of the window and a generous fillet 41 of adhesive is provided between the convex surface 39 of the bearing strip and the inner face of the innermost sheet of polycarbonate. The adhesive 41 is a flexible or elastomeric material which can deform appreciably under stress without rupture or loss of adhesion from the adjacent surfaces. A suitable material is RTV 630 silicone adhesive available from General Electric Company. Polyurethane or other adhesives are also suitable.

The aft edge of the window has a row of attachment holes extending through the bearing strip 38, the two polycarbonate layers 27 and 28 and the edge strip 32. A bushing 42 is pressed into each of the attachment holes and is adhesively bonded in place. The outside diameter of the bushing fits tightly into the hole in the polycarbonate sheets. The inner end of each bushing has an external shoulder or flange 43 which has a length that is not less than the thickness of the bearing strip and is preferably slightly longer than the thickness of the bearing strip to assure that it extends beyond the inner surface of the bearing strip. The shoulder 43 preferably fits closely in the hole through the bearing strip but some clearance can be provided so that the holes through the plastic can be drilled and the holes through the metal bearing strip punched before assembly without introducing excessive mismatch due to manufacturing tolerances. Thus, the holes in the bearing strip for receiving the shoulder end of the bushing are large enough to provide a slightly loose fit to accommodate small dimensional variations which may occur in the steel bearing strip and plastic window. Minimal clearance is preferred.

The outer end of each of the attachment holes is countersunk to receive the flared flat head 44 of a high strength bolt 46. The bushing 42 is long enough to extend into the reinforced phenolic edge strip 32 and the countersink is made after installation of the bushing so that the end of the bushing is countersunk the same as the surrounding plastic of the edge strip. Thus, the head 44 of the bolt seats tightly against the outer end of the bushing. In the illustrated embodiment the bushing extends through both transparent polycarbonate sheets. In some embodiments with plural sheets in the laminate, the phenolic edge strip can be thicker and the bushing extends through fewer of the transparent sheets. It is preferred that the bushing extend through at least the inner polycarbonate sheet for good in-plane load transfer.

The window 11 is bolted to a flange 47 of the aft beam or frame 26. A metal angle stiffener 48 extends along the flange 47. A spherical washer 49 and mating spherical nut 51 are provided on the inner end of the bolt 46 and tightly secure the window to the frame. The nut 51 is tightened so that there is a substantial tension in the bolt 46 and compressive load in the bushing 42. Since the shoulder portion 43 of the bushing has a length no less than the thickness of the steel bearing strip there is direct loading of the inner end of the bushing on the flange 47 and no tendency to shear the bushing from the plastic of the window. Load is transferred from the bolt head through the bushing to the flange rather than through the plastic. This avoids squeezing the flexible interlayer which could otherwise extrude from between the polycarbonate sheets along the edge of the window.

Polycarbonate plastic has a high degree of flexibility when impact loaded. It is found that in a bird test at a velocity of about 500 knots a large deflection occurs in the polycarbonate window. The deflection is transient and the window assumes substantially its original shape at the end of the test. FIG. 3 illustrates semi-schematically a typical deflection near the aft edge of a window when withstanding such impact loading. This figure represents an approximation of the deflection occurring, based on high speed motion pictures of a window during an impact test. Such deflection can occur over a length of several inches along the aft edge of the window. Smaller deflections are observed in other portions of the aft edge. Larger deflections can be observed with higher velocity impacts.

When the window deflects one aspect of the critical loading is in the plane of the window. To be effective the edge of the window must have sufficient strength to prevent failure of the plastic between the row of bushings and edge of the window which could cause the edge of the window to pull inboard away from the frame 26. Depending on the spacing of attachment holes and their distance from the edge of the window failure can occur by any of three modes. When holes are near the edge, "bearing" failure can occur with a tensile crack forming between the edge and the hole perpendicular to the edge. When the holes are further from the edge, "shear" failure can occur with breakage at about 45° angles from the hole to the edge. At still greater distances from the edge, "tensile" failure can occur as a break between adjacent holes parallel to the edge. It is preferred to have sufficient ductility in the edge of the window to deform the holes an appreciable amount without shear or bearing failure at the edge. The bolts are also strong enough to avoid breakage due to side loading.

The edge mounting arrangement should also have sufficient tolerance for rotation of the window edge to avoid breaking the bolts in tension or by bending which could also cause the edge of the window to pull away from the frame. The edge mount should also avoid bending the window at too small a radius so that the fiber stress in the plastic does not exceed the strength of the material.

It is found in impact testing a windshield with edge mounting as herein described, that the acrylic outer sheet 31 is heavily cracked and some fragments may be lost. The intermediate polycarbonate sheet 28 can have some cracks in the region of impact. It is found, however, that the innermost polycarbonate sheet 27 remains intact without cracks or spalls.

There is also a slight scalloping of the steel bearing strip 38 and the two polycarbonate sheets 27 and 28 along the edge of the window in the region of highest loading. The amount of scalloping of the inner polycarbonate sheet 27 is appreciably greater than the scalloping of the intermediate sheet 28, indicating that there is greater in-plane loading on the innermost sheet. It is observed that the magnitude of scalloping of the bearing strip is similar to that of the innermost polycarbonate sheet 27. Some of the bushings shift laterally towards the window edge, making the attachment holes somewhat oblong. The deformation of the holes in the innermost plastic sheet and the bearing strip is similar. These findings indicate that good transfer of loading has occurred and that the effective strength and ductility of the bearing strip in the plane of the windshield is about the same as the effective strength and ductility of the innermost polycarbonate sheet 27. By having the yield strength of the steel match the yield strength of the window, there is load sharing with the bearing strip without failure of the adhesive board. Because of this relation good edge strength and resistance to failure is obtained without adding excess weight.

Deformation of the attachment holes in the regions of highest stress permits the strain in the window to be applied against the bushings in nearby holes. A ductile edge mounting thus distributes loads to a plurality of bolts instead of causing failure of the edge in a region of high stress.

Resistance to plastic deformation in the plane of the windshield by the inner polycarbonate sheet 27 and metal bearing strip 38 is made comparable by close bonding between the two and the relative dimensions and properties of these materials. The stainless steel bearing strip is annealed so as to have relatively low yield strength and high ductility. The thickness of the stainless steel bearing strip is about 1/6 of the thickness of the polycarbonate sheet 27 so that the effective strength and ductility of each is about the same. The strength of the inner polycarbonate sheet is augmented by strength of the intermediate polycarbonate sheet 28 although relative displacement does occur between the two polycarbonate sheets due to the presence of the flexible interlayer 29.

Shear load is transferred between the inner polycarbonate sheet 27 and the bearing strip by way of the adhesive therebetween. Since the dimensions and properties of the edge of the transparency and bearing strip are matched to have similar in-plane deformation, non-uniform shear loading across the adhesive interface is minimized. Excess thickness of the metal bearing strip could cause failure of the adhesive bond upon impact.

The high strength bolts used with the bushings have a diameter smaller than the inside diameter of the bushings. There is a tight fit between the outside of the bushing and the attachment hole and a somewhat loose fit between the inside of the bushing and the bolt. Some shifting and rotation can also occur in the clearance space between the bolt and the flange 47 of the aircraft structure. Such tolerances accommodate manufacturing variations. The spherical washer 49 and nut 51 accommodate rotation of the bolt relative to the frame 26. The bushing serves to enhance the stiffness of the bolt to resist bending. The enlarged shoulder on the bushing provides one element of a couple with the bolts which resists lateral application of load on the bolt. In some embodiments shoulder bolts with enhanced stiffness can be used in lieu of the described bolts and bushings.

Motion of the window edge upon deflection as illustrated in FIG. 3 can cause some "broaching" or pulling through of the flared head 44 of the bolt through part of the glass reinforced phenolic edge strip 32. The term "braoching" refers to enlargement of the hole receiving the bolt due to removal of material by the bolt head as translational movement occurs between the bolt and the window edge substantially along the axis of the bolt. Tests indicate that little, if any, such broaching actually occurs in bird impact tests at velocities less than about 500 knots.

In bird impact tests where the impact velocity is somewhat more than about 500 knots, deflection of the window edge can cause appreciable "broaching" of the bolt head through the strong edge strip and the plastic of the windshield. Such pulling of the bolt head through the plastic limits the application of stress on the bolts and helps attenuate some of the impact energy in the plastic deformation and breakage which occurs. If desired an aluminum edge strip can be used to take advantage of its mechanical properties.

In one embodiment the relative diameters of the bushing and bolt head are selected so that the force required for pulling the bolt head through the plastic is less than the force that would cause tensile failure of the bolts. The bushing has an outside diameter of about 0.277 inch and the bolt head diameter is about 0.365 inch. The annulus between these represents material that is displaced or sheared as the bolt head pulls into the plastic. The glass fabric reinforced phenolic edge strip is somewhat more resistant to broaching than the polycarbonate. The resistance to broaching indicates the force required to open or enlarge the hole by the bolt head to permit the bolt head to pass at least part of the way through the hole. Broaching of the edge strip can occur when its resistance to broaching is less than the force required to break such a bolt. Thus, the force required to initiate broaching through the edge strip is about 2500 pounds and the resistance to broaching through the polycarbonate is about 1200 pounds. The bolt head and countersink have the same diameter so that the bolt head is flush with the surface of the edge strip. The diameter is sufficient that the plastic carries a load normal to the plane of the window less than the tensile strength of the bolt to assure broaching of the plastic rather than bolt breakage. Where a flush surface is not as important, other bolt head and bushing arrangements can be used. For example, a round head bolt can have its flat under surface against the end of a bushing flush with the surface of an edge strip or can be recessed in a cylindrical counterbore.

In the deflections shown in FIG. 3 the edge of the windshield may rotate relative to the aircraft frame through an angle 53 which can be several degrees. A rather small amount of broaching occurs in such circumstances as can be seen by close examination of the region adjacent the bolt head 44.

Upon higher velocity impact, additional rotation of the edge of the window relative to the frame can occur and in localized regions a deflection wave in the windshield can cause the edge to move away from the frame a small distance leading to additional broaching (not shown) of the bolt head through the plastic. Such pulling of the bolt head through the plastic avoids excessive loads on the bolts so that they remain intact and serve as pins bearing laterally against the plastic via the bushings for limiting inboard deflection of the edge of the window. Window edge deflections that appear to be as high as 30° can be observed in high speed movies of impact tests. Rotation of the edge of the window relative to the aft frame 26 is not readily evaluated, however, since elastic rotation of the aft frame is also present. Because of the possibilities for rotation and broaching, the bolts provide constraint in the plane of the window without excessive fixity between the window and frame, which could cause failure of the bolts or edge of the window.

Another mode of possible failure at the window edge could occur due to bending where the window engages the edge of the flange 47 on the aircraft structure. An excessively sharp bend could raise the outer fiber stress on the inner polycarbonate sheet 27 above its load carrying capacity. The bearing strip 38 serves to reinforce the polycarbonate and spread the concentrated load of the flange over an appreciable area on the innermost polycarbonate sheet 27, thereby limiting localized stresses. In a bird impact test at about 500 knots it was observed that a small permanent crease formed in the stainless steel bearing strip along a few inches of the aft edge of the window.

It is important to avoid a sudden increase in stress level in the polycarbonate sheet 27 adjacent the edge of the bearing strip. Thus, if the inboard edge 52 of the bearing strip were in contact with the innermost polycarbonate sheet 27, there would be a highly localized bending load, possible cutting of the plastic and a locus for probable failure of the window.

Gradual increase in load between one member and the edge of a second member can be effected by "feathering" or gradually tapering the edge of the attached member. Tapering or feathering of the inboard edge 52 of the bearing strip is not considered desirable since it is very difficult to obtain a uniform wide feathering on such a thin material. A technique is also known wherein thin sheets are layered with the edges stepped back to provide gradually decreasing thickness. Such an arrangement is apparently not feasible for the thin metal bearing strip. Further, the feathering or edge of a staggered assembly must end in a very thin edge at the inboard edge of the bearing strip. Such a thin edge would be quite susceptible to damage and, being sharp, could easily damage the surface of the polycarbonate and form a location for incipient failure. An alternative to feathering the inboard edge of the stainless steel bearing strip is therefore desirable.

Localized application of stress at the edge of the bearing strip is avoided by gradually curling the inboard edge of the bearing strip away from the polycarbonate sheet. This presents a convex surface 39 opposite the inner face of the innermost polycarbonate sheet. This space is filled with a flexible or elastomeric adhesive 41 which serves to transfer loads between the polycarbonate sheet and stainless steel bearing strip in case of window deflection. Upon impact deflection of the windshield the elastomer is squeezed between the inner face of the polycarbonate sheet and the bearing strip. The squeezing of the wedge-shaped fillet 41 deforms the elastomer to bulge as seen in FIG. 3. The magnitude of stress transferred through the fillet of adhesive 41 gradually decreases from a high level where the adhesive layer is thin to a relatively low level at the thick part of the fillet. This gradual change in coupling of stresses across the fillet of adhesive provides a stress pattern similar to that provided by feathering the edge of the bearing strip, and avoids the disadvantages.

The gradual changing radius of the bearing strip along the concave face also assures an adequate bend radius in the plastic. The maximum bending is limited by the steel bearing strip and fillet of elastomer. By having an appreciable bend radius, fiber stress in the innermost plastic sheet is maintained within the strength of the material, thereby preventing cracking and breaking.

In the deflection as illustrated in FIG. 3, it is assumed that the frame 26 is completely rigid and deflections occur only in the window and mounting bolts. A design as hereinabove described is considered adequate for withstanding a 500 knot bird impact test, with a completely rigid structural frame 26 connecting the window to the aircraft. As a practical matter some deflection of the frame 26 can be expected. Such deflection is superimposed on that of the window and provides an additional margin of safety.

When the window is subjected to a bird impact an appreciable portion of the impact energy is transmitted to the window. The transferred energy is partly attenuated in the plastic deformation of the steel bearing strip 38 and innermost polycarbonate layer 27. Some energy is dissipated in breakage of the outermost acrylic face ply 31 and some of the energy is transmitted to the aircraft structure by way of the attachments of the window to the vehicle. Some of the impact energy is attenuated by way of deformation of the polyurethane interlayer. Some energy is dissipated when bolt heads broach through the plastic material upon substantial window deflections.

The quantity of energy which must be dissipated in the windshield and airframe is limited by making the window as stiff as feasible within the weight and thickness limits consistent with use of the polycarbonate sheets. Increasing the stiffness of the window limits deflection and tends to keep the angle of application of impact force low. Excessive deflection of the window can create a "pocket" which tends to retain the object striking the windshield and cause large energy transfers. Stiffening the windshield tends to deflect the bird or other object away from the window so that much of the momentum is retained in the object rather than being transferred to the windshield and aircraft structure.

Although but one embodiment of this invention has been described in detail herein, many modifications and variations will be apparent to one skilled in the art. Thus, for example additional transparent sheets can be employed in such a laminate for greater thickness without increasing the fiber stress of the individual layers. An outermost glass face ply can be substituted for acrylic in some embodiments for greater resistance to scratching. Provisions can be made in the window for electrical heating for minimizing fogging and icing. Many other modifications and variations will be apparent to one skilled in the art. It is therefore to be understood that within the scope of the appended claims the invention may be practiced otherwise than as specifically described.

What is claimed is:

1. An impact resistant window comprising:
    a plurality of transparent synthetic plastic sheets bonded together by at least one flexible interlayer, the innermost sheet being formed of polycarbonate;
    a metal bearing strip adhesively bonded on the inner face of the innermost polycarbonate sheet along at least part of an edge of the window, the inboard edge of the bearing strip curling gradually away from the inner face of the innermost sheet presenting a convex side of the bearing strip towards the innermost sheet;
    a flexible adhesive between the bearing strip and the innermost sheet including a generally wedge-shaped portion between the convex side of the inboard edge of the bearing strip and the adjacent face of the innermost sheet; and
    means for connecting the edge of the window and bearing strip to a frame or the like.

2. An impact resistant window as recited in claim 1 wherein the means for connecting comprises a row of attachment holes along the edge of the window extending through at least the innermost transparent sheet and the bearing strip; and
    a bushing in each of the attachment holes including an enlarged shoulder portion on the innermost end of the bushing, the length of the shoulder portion being not less than the thickness of the bearing strip.

3. An impact resistant window as recited in claim 2 wherein each attachment hole includes a conical countersink at the outermost end of the hole, including a countersunk portion on the outermost end of the bushing in such a hole for receiving the head of a bolt extending through such bushing.

4. An impact resistant window as recited in claim 3 wherein the window includes an edge strip of reinforced plastic along the outside of such an edge of the window, such a countersink being in the plastic edge strip and having a diameter sufficient for receiving the head of a bolt which can apply a load in a direction normal to the plane of the window, the resistance to broaching of the edge strip adjacent the countersink being less than the strength of a bolt extending through such bushing.

5. An impact resistant window as recited in claim 4 including an outermost transparent sheet having a thickness similar to the thickness of the edge strip, an outboard edge of the outermost sheet including a bevel facing outwardly and being spaced apart from the edge of the edge strip; a bevel facing outwardly along an inboard edge of the edge strip, said bevels cooperating to define a generally V-shaped gap between the outboard edge of the outer face sheet and the inboard edge of the edge strip; and a weather resistant flexible sealant in such V-shaped gap and bonded to such bevels.

6. An impact resistant window as recited in claim 1 wherein a bushing is tightly fitted into at least the portion of the attachment hole through the plastic sheets and the outermost end of the bushing includes an exposed portion for engaging the underside of the head of a bolt extending through the bushing.

7. An impact resistant window as recited in claim 1 wherein the means for connecting comprises a row of attachment holes along the edge of the window extending through at least the innermost transparent sheet and the bearing strip, each attachment hole including a conical countersink at the outermost end of the hole for receiving the head of a bolt extending through such an attachment hole, such a bolt head having a diameter sufficient for applying a load in a direction normal to the plane of the window to a portion of the window having a resistance to broaching less than the strength of a bolt extending through such attachment hole.

8. An impact resistant window as recited in claim 7 wherein the window includes an edge strip of reinforced plastic along the outside face of such an edge of the window, such a countersink being in the plastic edge strip, the resistance of the reinforced plastic edge strip to broaching from the countersink in a direction normal to the plane of the window being greater than such broaching resistance of the polycarbonate sheet.

9. An impact resistant window as recited in claim 1 wherein the effective strength and ductility of the bearing strip in the plane of the window is approximately the same as the effective strength and ductility of the edge of the transparent laminate in the plane of the window.

10. An impact resistant window comprising:

a transparent laminate including a plurality of transparent synthetic plastic sheets bonded together by at least one flexible interlayer, the innermost sheet being formed of polycarbonate;

a metal bearing strip adhesively bonded to the inner face of the innermost sheet along at least part of an outboard edge of the window; and a row of attachment holes extending through the transparent laminate and metal bearing strip along such an edge; and wherein the effective strength and ductility of the bearing strip between such row of holes and the edge of the window in the plane of the window is approximately the same as the effective strength and ductility of the innermost polycarbonate sheet between such row of holes and the edge of the window in the plane of the window.

11. An impact resistant window as recited in claim 10 wherein each such attachment hole includes a bushing tightly fitted into the attachment hole through the plastic sheets and having an inner end not less than flush with the inner face of the bearing strip and an outer end having a portion exposed for engaging the underside of the head of a bolt extending through the bushing.

12. An impact resistant window as recited in claim 11 wherein each such attachment hole includes a conical countersink at the outermost end of the hole and wherein the exposed portion of the bushing includes a portion of such countersink, such a countersink having a diameter sufficient for receiving the head of a bolt which can apply a load on the plastic in a direction normal to the plane of the window, the resistance to broaching of the plastic adjacent the countersink being less than the strength of a bolt extending through such bushing.

13. An impact resistant window as recited in claim 12 wherein the window includes an edge strip along the outside face of such an edge of the window, such a countersink being in the edge strip, the resistance of the edge strip to broaching from the countersink in a direction normal to the plane of the window being greater than such broaching resistance of the polycarbonate sheet.

14. An impact resistant window comprising:
a transparent laminate including a plurality of transparent synthetic plastic sheets bonded together by at least one flexible interlayer, the innermost sheet being formed of polycarbonate;

an edge strip along the outside of an edge of the window;

a row of attachment holes along the edge of the window extending through at least a portion of the transparent sheets and the edge strip; and a countersink at the outermost end of each such hole for receiving the head of a bolt extending through such attachment hole, such a countersink being in the edge strip and having a diameter sufficient for receiving the head of a bolt which can apply a load in a direction normal to the plane of the window, the resistance to broaching of the edge strip adjacent the countersink being less than the strength of a bolt extending through such an attachment hole.

15. An impact resistant window as recited in claim 14 further comprising a metal bushing in each of the attachment holes and wherein the countersink includes a portion on the outermost end of such a bushing for receiving the head of a bolt extending through such bushing.

16. An impact resistant window as recited in claim 15 wherein the edge strip has a greater resistance to broaching in a direction normal to the plane of the window than the transparent sheets.

17. An impact resistant window as recited in claim 14 further comprising a metal bearing strip adhesively bonded to the inner face of the innermost plastic sheet along at least part of an edge of the window on the opposite face from the edge strip, the inboard edge of the bearing strip curling gradually away from the inner face of the innermost sheet presenting a convex side of the bearing strip towards the innermost sheet; and a flexible adhesive between the bearing strip and innermost sheet including a generally wedge-shaped portion of adhesive between the convex side of the inboard edge of the bearing strip and the adjacent face of the innermost sheet.

18. An impact resistant aircraft windshield comprising:
a plurality of transparent synthetic plastic sheets bonded together by at least one flexible interlayer, the innermost sheet being formed of polycarbonate;

a metal bearing strip adhesively bonded on the inner face of the innermost polycarbonate sheet along at least part of an edge of the window;

a row of attachment holes along the edge of the window extending through at least a portion of such transparent sheets and the bearing strip;

a bushing in each attachment hole and including an enlarged shoulder portion on the inner end in the portion of such attachment hole extending through the metal bearing strip;

a conical countersink at the outermost end of such attachment hole including a conical countersunk portion on the outermost end of the bushing in such hole;

a flat head bolt extending through such bushing and through an aircraft frame member, the head of the bolt engaging the countersunk portion on the outer end of the bushing, the inner enlarged shoulder portion of the bushing bearing against the aircraft frame member; and a spherical washer and spherical nut on such bolt on the opposite side of the aircraft frame member from the bolt head for securing the windshield to the aircraft frame member.

19. An impact resistant aircraft windshield as recited in claim 18 wherein the effective strength and ductility of the bearing strip between the row of attachment holes and the edge of the windshield in the plane of the windshield is approximately the same as the effective strength and ductility of the innermost plastic sheet between the row of attachment holes and the edge of the windshield in the plane of the windshield.

20. An impact resistant aircraft windshield as recited in claim 18 wherein the inboard edge of the metal bearing strip curls gradually away from the inner face of the innermost sheet presenting a convex side of the bearing strip towards the innermost sheet and further comprising a flexible adhesive between the bearing strip and the innermost sheet including a generally wedge-shaped portion between the convex side of the bearing strip and the adjacent face of the innermost sheet.

21. An impact resistant aircraft windshield as recited in claim 20 wherein the transparent laminate comprises, seriatim, an innermost sheet formed of polycarbonate, a flexible polyurethane interlayer, an intermediate sheet formed of polycarbonate, a flexible silicone interlayer, and an acrylic outermost sheet.

22. An impact resistant aircraft windshield as recited in claim 21 wherein the intermediate polycarbonate sheet extends outboard along the edge further than the acrylic outermost sheet and corresponding silicone interlayer, and further comprising a reinforced plastic edge strip adhesively bonded to the outer face of the intermediate polycarbonate sheet along such edge, the countersink portion of such attachment holes being in the reinforced plastic edge strip.

23. An impact resistant aircraft windshield as recited in claim 22 wherein the resistance to pulling such a bolt head through the edge strip is greater than the resistance to pulling the bolt head through the polycarbonate sheets, and less than the tensile strength of such bolt.

24. An impact resistant aircraft windshield as recited in claim 18 further comprising a reinforced plastic edge strip adhesively bonded to the outside face of the transparent plastic sheets along the edge and wherein the resistance to pulling such a bolt head through the edge strip is greater than the resistance to pulling the bolt head through the polycarbonate sheets, and less than the tensile strength of such bolt.

25. An impact resistant aircraft windshield comprising:
- a plurality of transparent synthetic plastic sheets bonded together by at least one flexible interlayer, the innermost sheet being formed of polycarbonate;
- a metal bearing strip adhesively bonded on the inner face of the innermost polycarbonate sheet along at least part of an edge of the window;
- a row of attachment holes along the edge of the window extending through at least a portion of such transparent sheets and the bearing strip;
- a metal bushing in each attachment hole;
- the effective strength and ductility of the bearing strip between the row of attachment holes and the edge of the windshield in the plane of the windshield being approximately the same as the effective strength and ductility of the plastic sheets between the row of attachment holes and the edge of the windshield in the plane of the windshield;
- a bolt extending through such bushing and through an aircraft frame member, the head of the bolt engaging the outer end of the bushing, the inner end of the bushing bearing against the aircraft frame member; and
- a nut on such bolt on the opposite side of the aircraft frame member from the bolt head for securing the windshield to the aircraft frame member.

26. An impact resistant aircraft windshield as recited in claim 25 wherein the inboard edge of the metal bearing strip curls gradually away from the inner face of the innermost sheet presenting a convex side of the bearing strip towards the innermost sheet and further comprising a flexible adhesive between the bearing strip and the innermost sheet including a generally wedge-shaped portion between the convex side of the bearing strip and the adjacent face of the innermost sheet.

27. An impact resistant aircraft windshield comprising:
- a plurality of transparent synthetic plastic sheets bonded together by at least one flexible interlayer, the innermost sheet being formed of polycarbonate;
- a metal bearing strip adhesively bonded on the inner face of the innermost polycarbonate sheet along at least part of an edge of the window;
- a reinforced plastic edge strip adhesively bonded to an outer face of one of the sheets along such edge;
- a row of attachment holes along the edge of the window extending through at least a portion of such transparent sheets, the edge strip, and the bearing strip;
- a bushing in each attachment hole;
- a bolt extending through such bushing and through an aircraft frame member, the head of the bolt engaging the outer end of the bushing, the inner end of the bushing bearing against the aircraft frame member; and
- a spherical washer and spherical nut on such bolt on the opposite side of the aircraft frame member from the bolt head for securing the windshield to the aircraft frame member; and wherein
- the resistance to pulling such a bolt head through the edge strip is greater than the resistance to pulling the bolt head through the polycarbonate sheets, and less than the tensile strength of such bolt.

28. An impact resistant aircraft windshield as recited in claim 27 wherein the effective strength and ductility of the bearing strip between the row of attachment holes and the edge of the windshield in the plane of the windshield is approximately the same as the effective strength and ductility of the innermost plastic sheet between the row of attachment holes and the edge of the windshield in the plane of the windshield.

29. An impact resistant aircraft windshield as recited in claim 27 wherein the inboard edge of the metal bearing strip curls gradually away from the inner face of the innermost sheet presenting a convex side of the bearing strip towards the innermost sheet and further comprising a flexible adhesive between the bearing strip and the innermost sheet including a generally wedge-shaped portion between the convex side of the bearing strip and the adjacent face of the innermost sheet.

* * * * *